Jan. 11, 1944.   H. WATKISS   2,338,748
DIRECTION SIGNAL
Filed May 26, 1941   2 Sheets-Sheet 2
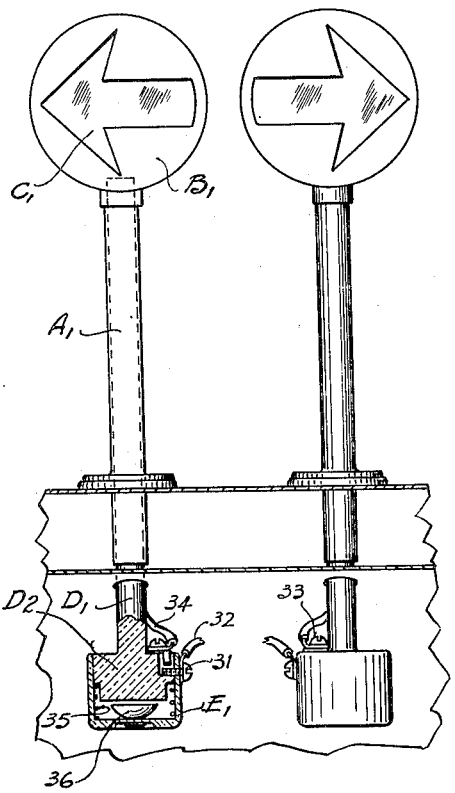
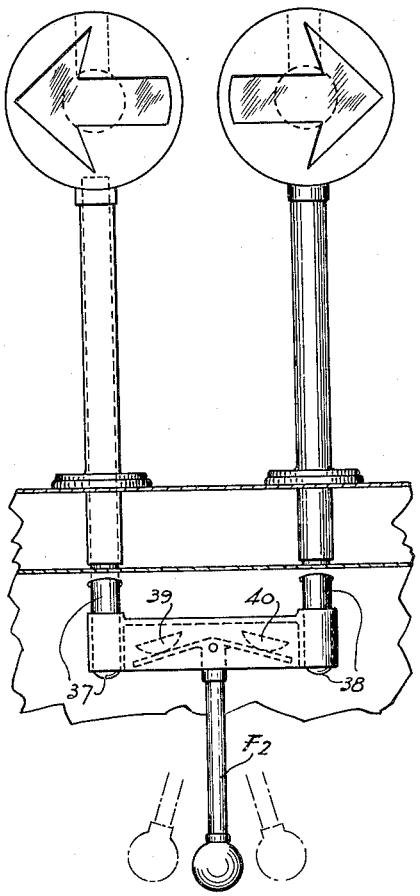
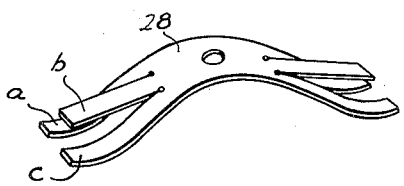
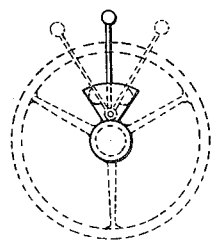
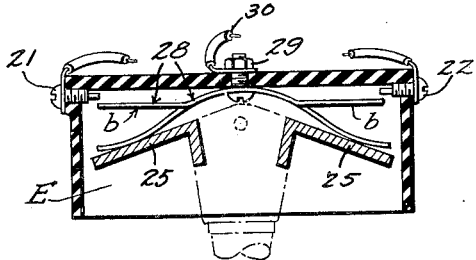
INVENTOR
Horace Watkiss
BY
ATTORNEY Patented Jan. 11, 1944

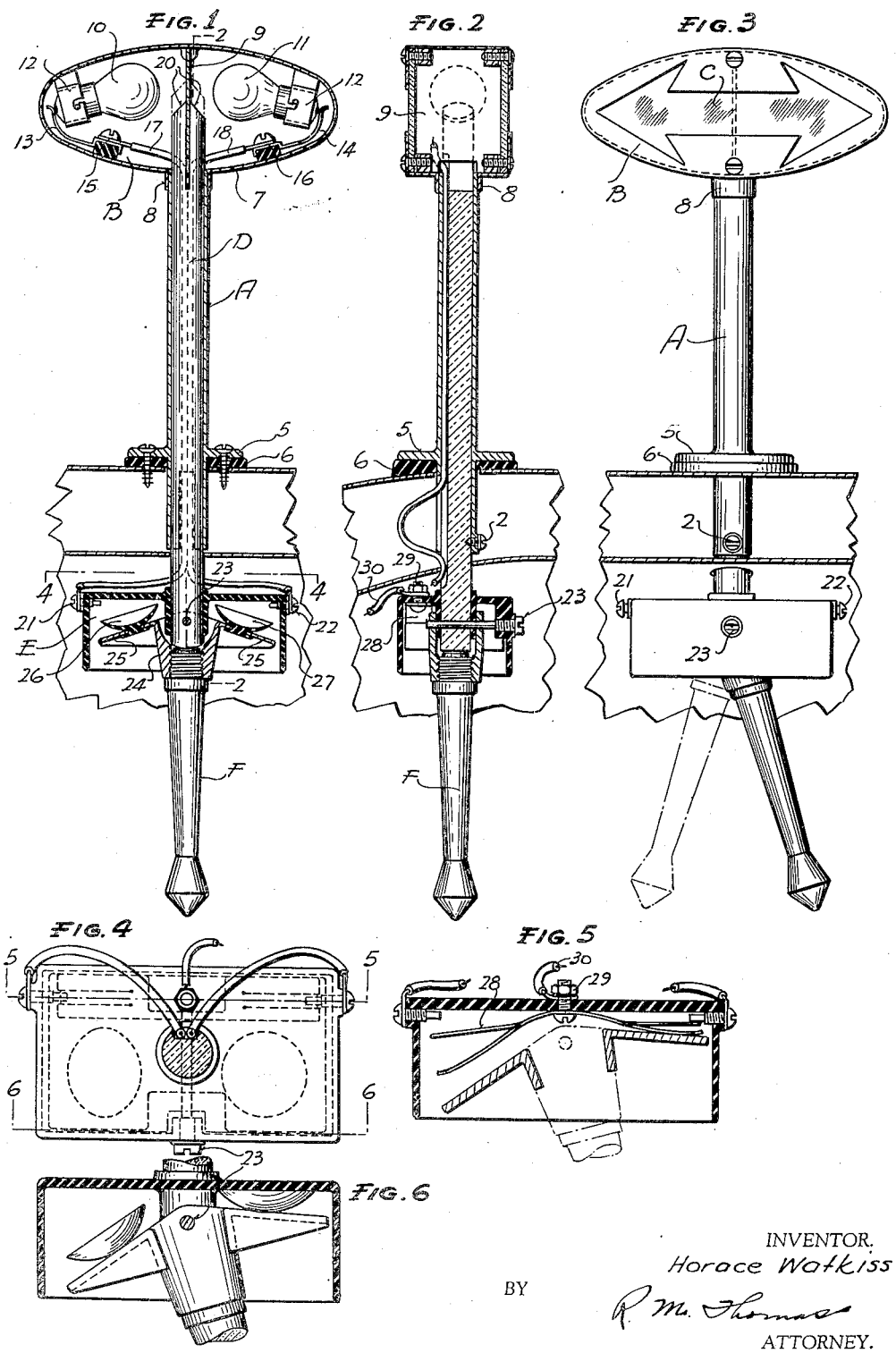

2,338,748

UNITED STATES PATENT OFFICE 2,338,748

DIRECTION SIGNAL

Horace Watkiss, Salt Lake City, Utah

Application May 26, 1941, Serial No. 395,195

4 Claims. (Cl. 177—329)

This invention relates to turn or direction-indicating devices, and has for its object to provide a new, simple, highly efficient conspicuous yet ornamental turn-indicating device which is mounted through and on the outside roof an automobile having a standard projecting therefrom upwardly to a height sufficient to insure the indicator being visible from all directions.

A further object of the invention is to provide a turn indicator for automobiles and like conveyances of the illuminated type which will add to the appearance of the automobile rather than detract therefrom and which will serve to definitely attract the attention of both motorist and pedestrian.

A still further object of this invention is to provide a direction or turn indicator which will be easy to operate and conveniently mounted for instantaneous operation of the driver of the vehicle. The operating lever is connected to the lower end of the standard and projects downwardly from the roof into the interior of the car and is situated so as to be conveniently reached by the driver.

A still further object of the invention is to provide a turn indicator which is provided with a colored luminous arrow on front and back which when illuminated points in the direction the vehicle intends to follow and which device when actuated by the operator has a lever inside the car within his field of vision which points in the same direction as the arrow which is illuminated outside.

Another important object of the invention is to provide in an indicator of the type described above a means for indicating to the operator that the same is in operation as well as indicating the direction he has indicated he intends to travel, so that at no time can the operator make a mistake.

A still further object is to provide a turn indicating device which incorporates the use of a light transmitting material such as a resinous plastic to indicate to the operator the direction of turn which the warning signal outside his view is indicating, the rays of light being transmitted to the operator through the connecting plastic bar or rod and through the handle.

A still further object is to provide a signal device in which the timing or duration of the light for indicating the turn is controlled by the use of rubber vacuum cups and the period of time elapsing from the point of contact until the circuit is broken being determined by the size of the cup or by other governing factors such as the smoothness of the surface onto which the cup is adhered.

A still further object is to provide a new means for controlling light circuits and the period of time during which they are to remain illuminated after the switch is actuated.

These objects I accomplish with the device illustrated in the accompanying drawings in which similar numerals and letters of reference indicate like parts throughout the several views, as described in the specification forming a part of this application and pointed out in the appended claims.

In the drawings:

Figure 1 is a vertical section of the signal device shown mounted through the top or roof of a vehicle, some parts being shown in elevation.

Figure 2 is a section on line 2—2 of Figure 1.

Figure 3 is an elevation of the device, dotted lines indicating one throw of the control lever and solid lines representing the opposite throw.

Figure 4 is a section on line 4—4 of Figure 1.

Figure 5 is a section on line 5—5 of Figure 4.

Figure 6 is a section on line 6—6 of Figure 4.

Figure 7 is a view of a modified type of device in which two standards and light casings may be employed with individual control switches for each standard indicating a turn in only one direction.

Figure 8 is a modified type of device showing the use of two standards through the roof of the vehicle but only one control lever such as is used in the preferred type of device shown in Figures 1 to 6 inclusive.

Figure 9 is a perspective view of the switch or contact member.

Figure 10 is a diagrammatic view wherein the switch elements are shown mounted on the steering column, the handle for controlling the switches being adjacent the steering wheel.

Figure 11 is a section on line 5—5 of Figure 4 showing the normal position of the spring body and contact parts thereof.

In the drawings Figures 1 to 6 inclusive show the preferred manner of constructing my invention in which a vertical standard or tubing A is provided with a flanged area 5 near the lower end thereof where it is adapted to be inserted through a hole bored through the top of the automobile roof with a suitable rubber washer 6 inserted between flange and roof. Suitable screws are used to secure the flange to the roof thereby supporting the standard vertically through the top. On the top end of the standard I provide an oval shaped signal B consisting of an oval shaped casing 7 having a collar 8 by which it is secured onto the top end of the tubing A. Each side is then provided with a glass or like substance on which or in which direction indicating arrows are formed as C. These arrows are formed in one piece making the arrow double headed and the casing is provided with a dividing partition 9 dividing the casing into two light compartments. Light globes 10 and 11 are mounted in suitable sockets 12 held in brackets secured to the casing 7. Contact strips 13 and 14 lead from the sockets to insulated contacts 15 and 16 respectively. The electrical current is carried to the light globes through wires 17 and 18 leading down one side of the standard tubing A. A rod D of resinous plastic material having light transmitting qualities is carried in the standard tubing A secured in place by screw 2 with a groove down one side in which the wires 17 and 18 are carried. The screw 2 permits adjustment of the rod D in tubing A as required. The top end of this rod is bifurcated with one leg on each side of the partition 9 and the extreme end of each leg is cut on a bevel at 20 to catch the light rays from the light globes and transmit the rays down the rod D. A light switch box E is secured onto the lower end of the rod D below the cloth masking used inside the automobile roof. This box E is preferably made of plastic or non-conducting material and the ends of the wires 17 and 18 are attached to the ends of the box E by terminal screws 21 and 22. The area of the box around the lower end of the rod D is formed tubular and a pivot rod and securing screw 23 is passed through one side of the box, through the tubular central portion and through the end of the rod D holding the box onto the rod and supporting it from the roof of the automobile. Adjacent the end of the rod D I provide a central or operating lever F which lever is also made of light transmitting resinous plastic to catch the rays from the rod D and disperse them from the knob end of the lever F. The rod 23 also supports and acts as a pivot for the lever F as the top end of the lever F is screwed into a tubular base of switch plate 24. The lower end of the rod D extends beyond the lower end of the standard tubing A and medially on one side of the box E I provide my switch which consists of a spring body 28 having the ends slotted to form each end into three slightly spaced fingers a, b, and c. These fingers are bent so that the medial fingers b engage the inner end of either of screws 21 or 22 depending upon the direction of movement of the lever F. The spring body 28 is attached to the top of the box by a contact screw 29 which has the lead wire 30 attached thereto. The wire 30 is connected to the battery or other source of electrical energy to supply the electrical current for the globes 10 and 11. The switch plate 24 has opposite sides extended as slanting wings 25 on which vacuum cups 26 and 27 are secured. The fingers a and c are bent down on each side of the fingers b and are engaged by the switch plate wings 25. These cups 26 and 27 are adapted to be brought into contact with the inner surface of the top of the box E as shown in Figure 6, to grip thereto, momentarily, or as long as desired by the operator of the automobile, the degree of pressure applied to the handle F against spring 28 controlling the amount of time the cups will grip the surface of the box. The spring 28 will force lever F to return to its normal position thereby breaking the electrical circuit by separating the finger b and the terminal screws 21 and 22. The surface of the box may be slightly roughened to vary the holding time of the cups, or the cups themselves may be provided with very minute perforations to allow air to enter slowly into the vacuum chamber. The normal position of the switch plate is such that when the lever F is hanging vertically the wings 25 are in contact with the spring fingers a and c and when the lever has been moved to either side to engage either vacuum cup then the wings 25 compress the respective fingers and force the finger b to engage the screw on its respective side making an electrical contact supplying current to the globe on that side of the casing B. When this is accomplished the globes will light up the end of the indicating arrow C behind which the globe is carried giving the traffic from each direction an indication that a turn is to be made, and also some rays of light from the globe will be transmitted through the rod D and lever F so that the driver will know by the illumination of the lever F whether or not his signal is properly operating and by the position of said lever F just what signal has been made.

In Figure 7 I have shown a single type of signal in which a standard A1 supports a one-way direction signal arrow C1 with the central light transmitting plastic rod D1 carried in the column or standard. In this type of device it is necessary to use two standards to indicate both right and left turn and they are intended to be used where the automobile has a centrally mounted radio antenna, the use of the two single type signals permitting the radio antenna to be placed between them without interference or contact therewith. The bottom of the plastic rod D1 is enlarged to support and carry the switch contact and box E1. This end enlarged as at D2 is provided with a simple push switch so that when the box is raised by the operator the contact screw 31 connected to the contact wire 32 from the battery will make contact with the contact screw 33 connected to the wire 34 which leads up through the standard to the globe (not shown) in the casing B1. The lower end of the enlarged end D2 of the rod D1 is made of smaller diameter to receive a compression spring 35 which normally presses the box E1 downwardly holding the contacts 31 and 33 apart. A vacuum cup 36 is mounted in the bottom of the box E1 and is adapted when the box is raised manually by the operator or driver to engage the bottom of the enlarged end D2 of the rod D1, thus holding the switch in contact for a predetermined period of time. The box E1 is also made of light transmitting material thus permitting the illumination from the enlarged end D2 to be visible to the driver. It will be obvious that this switch contact system of using a vacuum cup to hold a pair of electrical contact points in contact to complete an electrical circuit may be utilized in many different places such as lighting hallways where a person is passing through a dark hallway and wishes the light only while passing and desires it to be dark the rest of the time. Many such uses are possible and applicant wishes this feature to receive special attention as it is one of his major points of his invention.

In Figure 8 I have shown a modified type of my invention in which double standards are used to indicate to traffic that certain turns are to be made. The main features shown in this figure are double columns with individual plastic rods 37 and 38 carried in the columns. The lower ends of the plastic rods 37 and 38 glow when light is transmitted from the globes above and are readily seen by the driver. A single lever F2 controls the unit switch for the columns and extends down to within easy reach of the driver. This single switch consists of a metal or plastic lever F2 pivotally mounted at its head and formed as a T-shaped member with the wings of the T-head slanting outwardly and downwardly. These wings carry the vacuum cups shown in dotted lines 39 and 40. The same switch contact and switch system is used as in the devices shown in Figures 1 to 6 inclusive. Figure 10 shows a switch for operating the device mounted on the steering column should this be desired and it consists of a triangular shaped casing with a single control rod extending therefrom by which the signal is controlled. Suitable means are employed to secure the casing to the steering column.

Figure 11 is a sectional view through the switch box E and shows how the leaves of the switch spring 28 control the position of the operating lever by holding it normally in vertical suspended position.

Having thus described my invention I desire to secure by Letters Patent the following claims:

1. In a signal of the class described the combination of a standard tubular in form and having a securing flange formed thereon by which the standard is secured to and through the roof of an automobile; a rod of light transmitting plastic material carried in said standard; a signal casing mounted on the top end of said standard; light globes in said casing; conducting wires carried adjacent said rod, connecting said globes; signal indicating arrows carried in said casing; said light globes being so positioned as to illuminate said arrows indicating the direction of turn intended and also being positioned to provide illumination for said rod; a switch box mounted on the lower extended end of said rod; switch means in said box to turn one or the other of said light globes on to indicate a turn; and a handle extending below said box by which said switch means is operated, the inner end of said handle being in close proximity to the lower end of said rod, said handle also being made of light transmitting plastic to glow when the lights are turned on to indicate to the operator that the globes are burning and by its position which signal has been made.

2. A direction signal of the class described comprising a hollow vertical standard rigidly mounted through the roof of an automobile; a casing on the top end of said standard having direction indicating arrows formed therein to be in the field of vision of approaching traffic; a partition in said casing; a light globe mounted in each end of said casing so that when one light globe is on the arrow will show an intended turn in that direction; a plastic light transmitting rod carried in said standard and being so positioned relative to the globes as to transmit light rays from either of said globes down said standard; a control handle of light transmitting plastic pivotally mounted in vertical axial alignment with said rod and in close proximity to the end of said rod to receive light rays from said rod and transmit the rays into the field of vision of the operator; a switch controlled by said handle to turn one or the other of said light globes on; and electrical conduits to transmit electrical energy to said globes from said switch.

3. A device of the class described comprising a direction indicating signal supported on a stationary vertical standard mounted through the roof of an automobile; globes in each end of said signal; a partition dividing the interior of said casing; a light transmitting plastic rod carried in said standard with the top end bifurcated by said partition and being so positioned relative to the globes as to transmit light rays from either globe down to the base of said rod; a pivoted light transmitting plastic handle mounted adjacent the base of said rod normally in vertical alignment therewith but so mounted that it may be shifted from side to side, being always in close proximity to the end of said rod to continue the transmission of the light rays from the globes to the end of the handle in full view of the operator; conductor means to provide energy to said globes; and switch means operated by the handle to turn either of said globes on.

4. A device of the class described comprising a direction indicating signal casing mounted on a vertical stationary standard through the roof of an automobile; means to illuminate said casing to indicate a turn; a plastic rod carried in said standard for transmitting part of the illumination from said means down the rod; a control handle made of similar plastic and pivotally mounted depending from the end of said rod, said handle being in close proximity to the lower end of said rod so as to receive and transmit said illumination from the rod to the field of vision of the operator to indicate that the signal is operating; and switch means operated by said handle to complete a circuit to said illuminating means, thereby illuminating said signal casing when the handle has been moved from depending position to either side position, the position of the handle to indicate the direction of turn being indicated by the signal casing.

HORACE WATKISS.